INVENTOR.
CHARLES ZELNICK
BY
*Learman, Learman & McCulloch*
ATTORNEYS

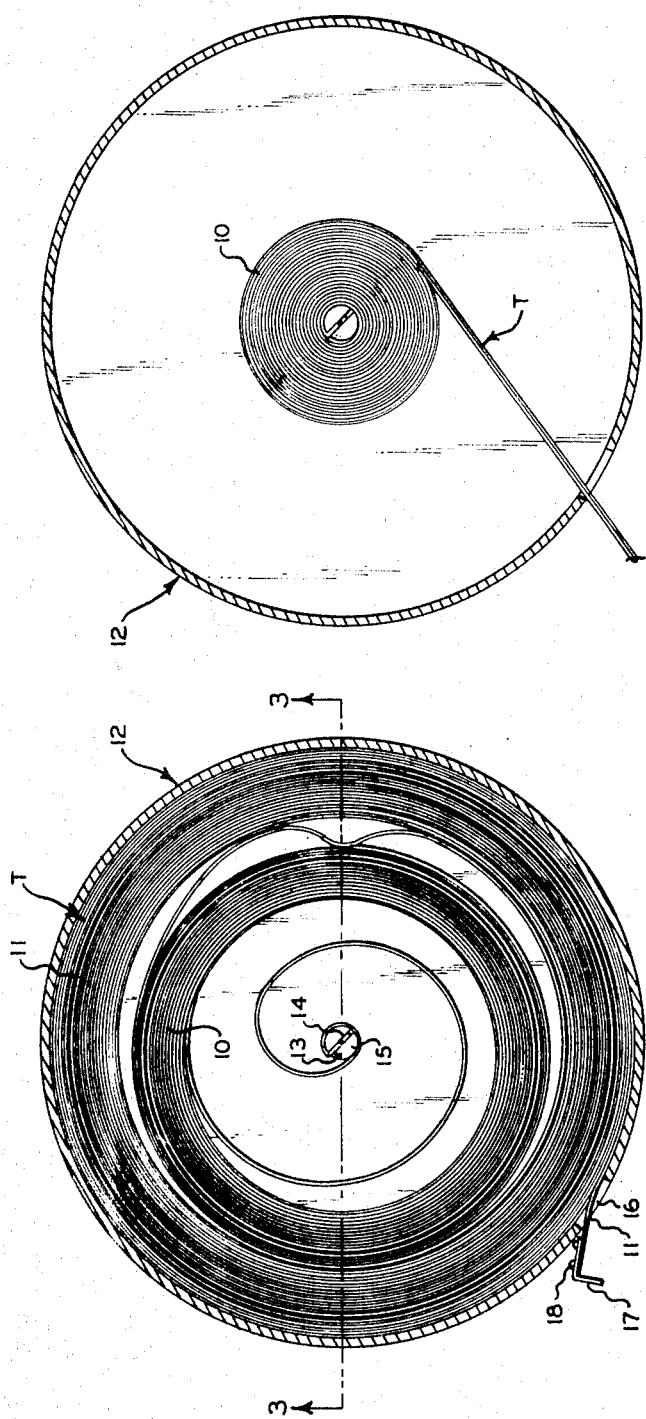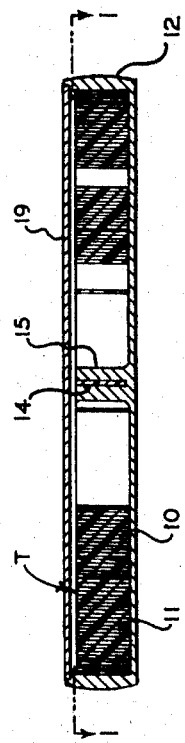

United States Patent Office 3,439,428
Patented Apr. 22, 1969

3,439,428
PLASTIC MEASURING TAPES AND METHODS OF MAKING SUCH TAPES
Charles Zelnick, Saginaw, Mich., assignor, by mesne assignments, to Cooper Industries, Inc., Houston, Tex., a corporation of Ohio
Continuation-in-part of application Ser. No. 178,181, Mar. 7, 1962. This application Nov. 20, 1964, Ser. No. 412,816
Int. Cl. B01b 3/10; B29c 17/02
U.S. Cl. 33—137                        11 Claims The present application is a continuation-in-part of my application Ser. No. 178,181, filed Mar. 7, 1962, now abandoned for Measuring Tapes and Methods of Making Such Tapes.

The invention relates to tape products and more particularly to an all plastic measuring tape wherein the tape casing and the retrieval spring as well as the tapeline are all formed of plastic and accordingly are electrically non-conductive in character and may be used with complete safety by electricians, maintenance people, laboratory workers, and the like. While the product is particularly designed for use by those who are concerned with electrical conductance, it is also believed that it can be produced at a price which will make it readily salable to those who now purchase conventional metal tapes.

One of the principal objects of the invention is to provide a plastic tape incorporating a spring formed of the same material which is formed so as to provide the power to retrieve a tapeline with the same efficiency as present springs formed of metal, and to provide an economical and reliable method of forming such a plastic tape.

A further object of the invention is to produce a tape of the character described wherein the tapeline has excellent dimensional stability when wet, as well as when dry, which is sufficiently flexible so that it can be bent to a considerable degree without fracturing or deforming the tapeline, and which is sufficiently resilient so that it returns to the dimension at which it has been thermally set, if it is stretched.

A further object of the invention is to provide a measuring tape which has great tear strength, excellent resistance to abrasion, and a negligible moisture absorptivity.

Other objects of the invention are concerned with providing a tape having smooth surface characteristics, great tensile strength and a low elongation factor when wet, as well as when dry, and which is resistant to ultraviolet light or sunlight, is insoluble in and unaffected by most chemicals, and, finally, resists deterioration due to the action of microorganisms and insects.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

FIGURE 1 is a somewhat schematic sectional plan view taken on the line 1—1 of FIGURE 3 through a measuring tape casing, with the tapeline shown in normal position wound around a retrieval spring portion;

FIGURE 2 is a similar view showing the tapeline withdrawn from the casing;

FIGURE 3 is a transverse sectional view taken on the line 3—3 of FIGURE 1;

Referring now more particularly to the accompanying drawings, in which I have shown preferred forms of the invention only, a letter T generally indicates a tape strip (shown in coiled form in FIGURES 1 and 3) including a first inner portion 10 formed of successive lengthwise increments which are heat set in longitudinally arcuate shape, the normally coiling tape portion 10 being backwound in a direction opposite to the direction of wind it would take when unrestrained to provide a power spring portion. The tape strip T also includes a second section 11 in which successive lengthwise increments of the section are heat set in a longitudinal plane to form a normally linear section which may be utilized as a tapeline.

Figure 10:
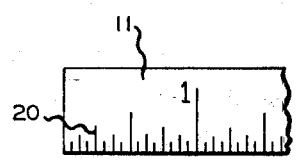
FIGURE 10 is a top plan view illustrating the tapeline which is formed.

As shown in FIGURE 1, the spring section 10, when inserted into a tape casing generally designated 12, has an angularly disposed inner end 13 which may be received within a slot 14 provided in a central anchor post portion 15 provided as an integral portion of the casing 12. The outer end of the tapeline strip T, which extends out the opening 16 provided in the casing 12, has a plastic retaining tab 17, secured thereon with plastic rivets 18 or the like, which engages the marginal edge of the opening 16 to prevent the tapeline portion 11 from being drawn entirely into the casing 12 by the spring 10. A plastic cover 19 which may be secured in place on the casing with a suitably nonconductive adhesive, such as an epoxy adhesive, is illustrated in FIGURE 3, and FIGURE 10 shows the outer end of the tapeline 11 with the dimensions marks or symbols 20 provided thereon.

The tape strip T is a length of polyethylene terephthalate film of the type known commercially as Mylar film. As is well known, this film is the amorphous condensation polymer resulting from the well-known esterification reaction between ethylene glycol and terephthalic acid or the alcoholysis of a terephthalic acid ester with ethylene glycol. The weight average molecular weight of the commercial polymer is 20,000 to 30,000.

After extrusion in film form in relatively wide sheets of a thickness in the range .008–.020 of an inch, the film is continuously longitudinally stretched at a rate of at least 400% per minute from 2.5 to 3.25 times its original length in the longitudinal direction at a temperature within in the range of 80° C.–90° C. Thereafter, the film is stretched in the transverse direction at a rate of at least 400% per minute to substantially the same extent at a temperature within the range 95° C.–110° C. Finally, the biaxially stretched film is heat set in this stretched condition at a temperature within the range of 200° C.–250° C. The stretching in both directions can be accomplished with conventional tensioning rolls of well-known design which maintain the stretched condition while the film is passed through a suitable oven.

Thereafter, when the material has cooled to room temperature, the relatively wide Mylar sheet is slit into strips which may, for example, be ½ or ¾ of an inch in width, to form the tape strips T. Preferably, the Mylar film will have a pigment incorporated in it so that it may provide a suitable background color providing the legibility required for the tapeline portion 11. For instance. a titanium oxide pigment may be incorporated in the Mylar film, prior to extrusion, which will provide a white tape product T.

Figure 4:
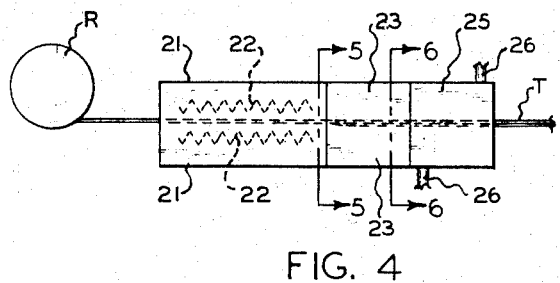
FIGURE 4 is a schematic, side elevational view of processing apparatus for forming the tape including dies for heat setting a transverse curvature in the tape.
Figures 5, 6:
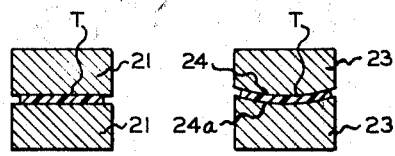
FIGURE 5 is a transverse sectional view, taken on the line 5—5 of FIGURE 4.
FIGURE 6 is a transverse sectional view taken on the line 6—6 of FIGURE 4.

Once the tapes T have been heat set in stretched condition, so that they will have proper dimensional stability, they are preferably heat set with a transverse curvature in the manner disclosed in FIGURES 4-6. It has been found that if the spring portion 10 of the tape T is first of all formed with a transverse curvature and heat set in this curvature, the spring, when later backwound, will have a better retrieving action. It has further been determined that if the tapeline portion 11 is heat set with a transverse curvature, the tapeline will have a greater rigidity which is desirable.

The forming and heat setting operation is accomplished by pulling each line T from a reel R between elongated, heated upper and lower members 21 preferably having electrical resistance elements 14a, as shown in FIGURE 4, which heat the strips T to a temperature such that heat setting can be accomplished by the dies 23 which have the complementary curvilinear surfaces 24 and 24a. The tapes are preferably drawn slowly between the elongate members 21 at a rate of speed such as to heat the tapes as rapidly as possible to the desired heat setting temperature of about 400° F.–410° F. The dies 23 are relatively short in length in comparison to the length of members 21, which are spaced to freely pass the tape T, so that little frictional pull is exerted on the relatively plastic strip T as it passes through the curvilinear die surfaces 24 and 24a. Once the strip is heat set in a state of curvature, it is immediately chilled to 30° F.–50° F. in hollow dies 25 which preferably have coolant tubes 26 connected to a continuously circulating source of fluid coolant. The length of dies 25, which have the same transverse curvature as the dies 23, is also minimal relative to members 21 to reduce the friction drag on the tapes T.

While Mylar strips are preferred, various thermoplastic, synthetic plastic materials which can be heat set in a condition to which they will return may be used in fashioning tape products according to the invention. For instance, nylon film, polytetrafluoroethylene film, and polychlorotrifluoroethylene film may be employed. A typical tape strip may be ¾ of an inch in width and .010 of an inch in thickness. If the strip is less than .008 of an inch in thickness it will be too flexible for my purposes and if more than .020 of an inch in thickness it will not be flexible enough.

Figure 7:
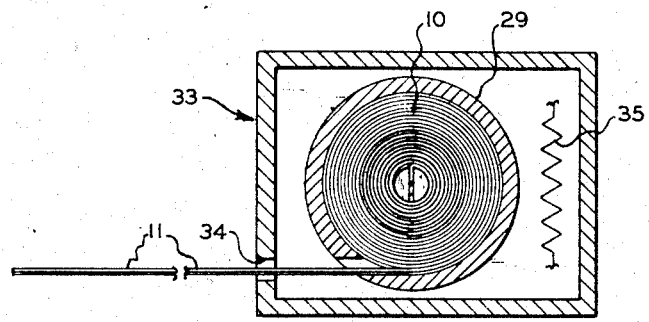
FIGURE 7 is a schematic sectional view illustrating one manner in which the spring portion of the tape may be heat set to normally wind up in a particular direction.
Figure 8:
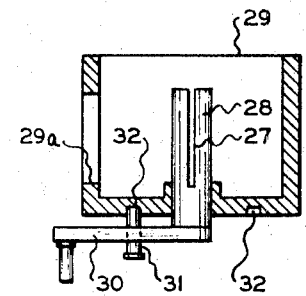
FIGURE 8 is a sectional side elevational view of a particular form of drum which may be employed in the heat setting operation.

Once a particular tape strip T, including both portions 10 and 11, has been heat set in a state of transverse curvature and cooled to substantially room temperature, one of its ends 13 is sharply creased to a condition of permanent deformation, passed through an opening 29a in a forming casing 29, and inserted in the slot 27 (see FIGURE 8) of a post 28 which is rotatably mounted in the forming casing 29. The forming casing 29, which is formed of a suitable heat resistant metal, may be provided with a handle 30 attached to the revolvable post 28 which is used to wind the spring portion 10 only of the tape strip T into the casing 29 in the manner indicated in FIGURE 7. A slideable pin 31 carried by the handle 30 is engageable with one of a plurality of openings 32 in the casing 29 to hold the handle 30 in position once the portion 10 of the tape strip T has been wound into a tightly wound coil having engaging adjacent convolutions in the forming casing 29.

Thereafter, the forming casing 29 may be placed within an oven 33 which has an opening 34 out which the portion 11 may be drawn so that it is outside the heated atmosphere of oven 33. The oven 33 may be provided with suitable electric resistance heating coils 35 which will heat the portion 10 of the tape strip T wound within the forming drum 29 to a suitable heat setting temperature of 385° F.–395° F. The forming drum 29 is formed of a heat conductive material to quickly transfer the heat of the oven 33 to the tightly wound portion 10 of the tape strip T. After heat setting for approximately a half an hour, the lengthwisely curved increments of the portion 10 of the strip accept the configuration of the coils and are permanently coil set, and thereafter the forming casing 29 may be removed from the oven enclosure 33 and cooled down to room temperature.

Figure 9:
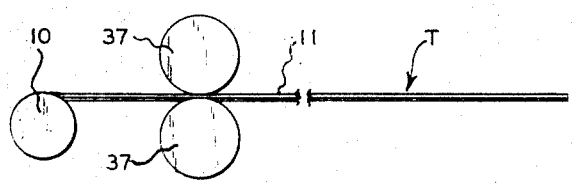
FIGURE 9 is a side elevational view of printing roll mechanism for printing dimensions on the tapeline.

Once the tape strip T has cooled, it is removed from the forming drum 29. The tapeline portion 10 may then be drawn through printing rolls such as shown at 37 in FIGURE 9, which print the symbols comprising dimensions 20 and numerals on the upper surface of the line portion 10. The end 13 is placed in a suitable apparatus for backwinding the portion 10 of the strip T in a direction opposite to the longitudinal curvature in which the coils have been set.

Apparatus suitable for performing this backwinding operation is shown in Zelnick et al. Patent No. 3,145,759, granted Aug. 25, 1964. Instead of first feeding the tape strip through forming mandrels, however, the end of the tape is simply inserted in the slot of the retractable winding arbor and the entire tape strip T is tightly backwound on the retractable arbor. Then the entire coiled tape strip T is removed in wound condition and inserted in the tape casing 12, with the outer end portion drawn out through the opening 16 therein. The tape strip T, which has been held in the tightly coiled position in which it is backwound, is then permitted to expand, as in FIGURE 1, so that the convolutions of the spring portion 10 expand in a peripheral direction. When the portion 11, which has the dimensions 20 printed thereon, is withdrawn from the casing 12, as in FIGURE 2, the spring portion 10 is compressed, as shown, and stores the necessary power to retrieve the tapeline portion 11 of the tape strip T.

Throughout the operation each successive case of heat setting must be performed at a heat setting temperature lower than the immediately previous heat setting temperature so as not to affect the characteristics which were previously heat set in the tape strip T. For instance, the heat setting temperature for heat setting the transverse curvature in the tape strip T must be less than the temperatures which heat set the longitudinal and transverse stretch in the film. Similarly, the temperature for setting the increments of longitudinal curvature in the spring portion 10 of the tape strip T must be lower than the previous heat setting temperatures employed.

When Teflon or polytetrafluoroethylene plastic film is used to form the product, the biaxial stretching is accomplished at about 100° C., dimensional stability is heat set in the film immediately thereafter at about 265° C., the heat setting temperature for setting a transverse curvature in the strip is about 265° C. and the heat setting temperature reached by the wound portion 10 in the oven 33 is about 250° C.

Figure 11:
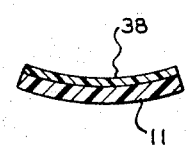
FIGURE 11 is a transverse sectional view illustrating a modified form of tapeline which may be manufactured.

FIGURE 11 illustrates a modified form of the invention in which the tape strip portion 10 is not printed and instead a very thin, transparent Mylar film strip 38, having symbols printed on its bottom surface, is bonded to the upper surface of the portion 10, a suitable adhesive being used to bond the transparent strip 38 to the tapeline portion 11. The protective strip 38 will be on the order of .004–.010 of an inch in thickness and the strip will have been stretched and heat set in the same manner as the tape strip T. After the adhesive has set, the strip T is then backwound in the manner previously described. A transparent adhesive is used so that the dimensions printed on the inner face of the strip 38 will be clearly visible.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention.

I claim:
1. A method of making a measuring tape in which a tapeline is withdrawable from an opening in a tape casing comprising: coiling a first portion of the length of an elongated, narrow, thermoplastic plastic film strip in the thickness range of about .008–.020 of an inch in planar convolution and heat setting it so that the said portion when free will form a coil spring having substantially adjacent engaging convolutions in a substantially common plane; providing dimension marks for the remaining portion of the strip; winding the said first portion into a coil in a direction opposite to the direction of wind said first portion will take when unrestrained; and securing the free end of said first portion within a tape casing with a part of the printed portion in position to extend out the opening in the tape casing.

2. A method of making a tape product in which a tapeline is withdrawable from an opening in a tape casing comprising: heat setting, at a temperature of about 385° F.–395° F., a first portion of the length of an elongated, narrow, polyethylene terephthalate film strip having first and second portions in a shape so that the said first portion when unrestrained will form a resilient coil having generally adjacent convolutions in a substantially common plane; and securing said first portion within a tape casing in position so that said second portion can be withdrawn out the opening in the tape casing and when released will be retracted by said first portion.

3. A method of making a tape product in which a tapeline is withdrawable from an opening in a tape casing comprising: heat setting a first portion of the length of an elongated, narrow, thermoplastic, biaxially stretched plastic film strip in the thickness range of about .008–.020 of an inch, and having first and second portions, in a shape so that the said first portion when unrestrained will form a resilient coil having generally adjacent convolutions in a substantially common plane; securing said first portion within a tape casing in position so that said second portion can be withdrawn out the opening in the tape casing and when released will be retracted by said first portion.

4. A method of making a measuring tape in which a tapeline is withdrawable from an opening in a tape casing comprising: heating a dimensionally stable, narrow polyethylene terephthalate film strip in the thickness range of about .008–.020 of an inch to a first predetermined temperature and heat setting it in a form in which it has a concavo-convex cross section; cooling said strip; heat setting a first portion of said strip in a shape at a second predetermined lower temperature so that the said portion when unrestrained will form a coil having adjacent convolutions in one plane; applying dimension marks to the remaining portion of the strip; winding the said first portion into a coil in a direction opposite to the direction of wind said first portion will take when unrestrained; and securing said first portion within a tape casing with at least a portion of the remaining portion in position to extend out the opening in the tape casing.

5. The method defined in claim 4 in which the first temperature is about 395°–410° F. and the second temperature is about 385°–395° F.

6. A tape product comprising: a casing having a tape opening therein and generally central anchoring means therein; an elongated, narrow plastic film strip portion, heat set to form a coil with generally adjacent, planar convolutions when unrestrained, backwound in a direction opposite to the direction of wind of said form the said strip will take when unrestrained and having an inner end secured to said anchoring means; and an elongated, narrow film strip section of plastic material, wound in surrounding relation to said backwound portion and connecting with said portion so that, when pulled progressively out through said tape opening, said portion is wound up and energy is stored in said portion which will restore said section to said casing when it is released.

7. A measuring tape comprising: an electrically nonconductive plastic casing having a perimetral tape opening therein and a generally central post; an elongated, narrow, electrically nonconductive plastic film strip portion, heat set to form a coil with adjacent, engaging, planar convolutions when unrestrained, backwound in a direction opposite to the direction of wind of said form the said strip will take when unrestrained and having an inner end secured to said post; and an elongated, narrow, dimensioned film strip section of electrically nonconductive plastic material, wound in surrounding relation to said portion and connecting with said portion so that, when pulled progressively out through said tape opening, said section winds up said portion and stores energy in said portion which will restore the dimensioned section to said casing when it is released.

8. The combination defined in claim 7 in which said film strip is polyethylene terephthalate.

9. The combination defined in claim 7 in which said film strip is polytetrafluoroethylene.

10. The combination defined in claim 7 in which said strip portion and strip section are heat set with a concavo-convex cross section.

11. The combination defined in claim 10 in which said strip portion when backwound flattens out of its normal concavo-convex cross section.

References Cited

UNITED STATES PATENTS

| | | | |
|---|---|---|---|
| 2,684,534 | 7/1954 | Ljunghery | 33—138 |
| 2,833,534 | 5/1958 | Foster | 267—1 |
| 2,897,546 | 8/1959 | Clapp et al. | 264—339 |
| 2,975,484 | 3/1961 | Amborski | 264—289 |
| 2,992,487 | 7/1961 | Miller | 33—138 |
| 2,994,958 | 8/1961 | Beeber | 33—137 |
| 2,375,357 | 5/1945 | Friedman. | |
| 2,796,631 | 6/1951 | Stegmann. | |

OTHER REFERENCES

Spring Material Substitutes Have Unconsidered Qualities, W. W. Boyd, Product Engineering, pp. 112–113, February 1943.

WILLIAM D. MARTIN, JR., *Primary Examiner.*

U.S. Cl. X.R.

242—84.8, 107.2; 264—339; 267—1